US011009852B2

(12) United States Patent
Liu (10) Patent No.: US 11,009,852 B2
(45) Date of Patent: May 18, 2021

(54) NUMERICAL CONTROLLER AND DATA EDITING METHOD (71) Applicant: FANUC CORPORATION, Yamanashi (JP)

(72) Inventor: Zhaojia Liu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/442,877

(22) Filed: Jun. 17, 2019

(65) Prior Publication Data
US 2020/0026261 A1 Jan. 23, 2020

(30) Foreign Application Priority Data
Jul. 20, 2018 (JP) ............................. JP2018-136380

(51) Int. Cl.
G05B 99/00 (2006.01)
G05B 19/4097 (2006.01)
(52) U.S. Cl.
CPC ...... G05B 19/4097 (2013.01); G05B 2219/32337 (2013.01)
(58) Field of Classification Search
CPC .......................................... G05B 2219/32104
USPC ............................................................. 700/97
See application file for complete search history.

(56) References Cited

U.S. PATENT DOCUMENTS 9,707,680 B1 7/2017 Jules et al.
10,259,070 B1 * 4/2019 Pfaff .................. B23K 26/0876
2002/0031019 A1 * 3/2002 Nakamura ......... G05B 19/4068
365/200

(Continued)

FOREIGN PATENT DOCUMENTS

CN 101894279 A * 11/2010
JP 2002-91523 3/2002

(Continued)

OTHER PUBLICATIONS

Brouet, Multi-touch gesture interactions and deformable geometry for 3D edition on touch screen, Universite de Grenoble (France), 2015, p. 73 (Year: 2015).*

(Continued)

Primary Examiner — Suresh Suryawanshi
(74) Attorney, Agent, or Firm — Wenderoth, Lind & Ponack, L.L.P.

(57) ABSTRACT

A numerical controller which uses a simulation screen displayed on a touch panel so as to edit operation data of an industrial machine includes: a touch operation reception unit that receives a touch operation by an operator on the simulation screen; an operation identifying unit that identifies an operation target and an operation type on the simulation screen by the touch operation received; a setting screen data extraction unit that references the editing data storage unit for associating the operation target and the operation type and setting screen data including an editing item so as to store them so as to extract the setting screen data corresponding to the operation target and the operation type identified; an editing processing unit that edits the setting screen data extracted; and a setting screen output unit that outputs, to the touch panel 40, the setting screen data after being edited.

8 Claims, 10 Drawing Sheets (56) References Cited

U.S. PATENT DOCUMENTS

| | | | | |
|---|---|---|---|---|
| 2008/0058984 A1* | 3/2008 | Gray | ................... | G05B 19/4069 |
| | | | | 700/192 |
| 2008/0162104 A1* | 7/2008 | Onishi | ................. | G05B 19/056 |
| | | | | 703/13 |
| 2015/0066212 A1* | 3/2015 | Yahaba | ................ | G05B 19/409 |
| | | | | 700/275 |
| 2015/0268661 A1* | 9/2015 | Ogawa | ............... | G05B 19/4097 |
| | | | | 700/182 |
| 2015/0346906 A1* | 12/2015 | Komatsu | ............... | G06F 3/0418 |
| | | | | 345/174 |
| 2016/0179085 A1* | 6/2016 | Seitz | .................... | G05B 19/414 |
| | | | | 700/180 |
| 2016/0253082 A1* | 9/2016 | Sakamoto | ............. | G05B 19/195 |
| | | | | 715/719 |
| 2017/0132194 A1* | 5/2017 | Lee | ......................... | G06F 40/18 |
| 2017/0344250 A1* | 11/2017 | Iwamura | ............. | G06F 3/04847 |
| 2017/0371316 A1* | 12/2017 | Kimura | .............. | G05B 19/4097 |

FOREIGN PATENT DOCUMENTS

| | | |
|---|---|---|
| JP | 2015-147259 | 8/2015 |
| JP | 2017-211956 | 11/2017 |
| JP | 2019-175335 | 10/2019 |
| WO | 2018/051435 | 3/2018 |

OTHER PUBLICATIONS

Mitsubishi, M80W Computer Numerical Controller (CNC) Features Intuitive Touch-Screen Operation, Mitsubishi, 2017, pp. 7 (Year: 2017).*

Notification of Reasons for Refusal dated Sep. 23, 2020 in Japanese Patent Application No. 2018-136380.

\* cited by examiner

| DISPLAYED ITEM | DISPLAY RANGE (VERTEX POSITION OF RECTANGLE INCLUDING TOOL) | OPERATION TYPE | STEP | SCREEN INCLUDING SETTING ITEM RELATED TO OPERATION (SETTING SCREEN, ITEM 1, ITEM 2,...) |
|---|---|---|---|---|
| DRILL | (P11,P12,P13,P14) |  | S1 | (CUTTING INPUT SCREEN, FEED SPEED) |
| HOLE SHAPE | (P21,P22,P23,P24) |  | S2 | (HOLE POSITION SETTING SCREEN, X, Y COORDINATE VALUES) |
| ⋮ | ⋮ | ⋮ | ⋮ | ⋮ |
| TURRET | (P31,P32,P33,P34) | | S3 | (TOOL SETTING SCREEN, TOOL NUMBER, COMPENSATION NUMBER) |
| ⋮ | ⋮ | ⋮ | ⋮ | ⋮ |
| HOLE SHAPE | (Pn1,Pn2,Pn3,Pn4) |  | Sn | (HOLE DIMENSION SETTING SCREEN, DEPTH) |
| ⋮ | ⋮ | ⋮ | ⋮ | ⋮ |

NUMERICAL CONTROLLER AND DATA EDITING METHOD

This application is based on and claims the benefit of priority from Japanese Patent Application No. 2018-136380, filed on 20 Jul. 2018, the content of which is incorporated herein by reference.

BACKGROUND OF THE INVENTION

Field of the Invention

The present invention relates to a numerical controller and a data editing method.

Related Art

Conventionally, for example, in numerical controllers (NC (Numerical Control) devices) which control machines (including various machines such as a service robot, a forging machine and an injection molding machine) such as a machine tool and an industrial robot, display devices are provided. Here, the numerical controller includes a computer numerical controller (CNC device) and the like, and in the following description of the present specification, the numerical controller includes a computer numerical controller and the like. In the following description of the present specification, machines such as a machine tool and an industrial robot which are controlled by the numerical controller are industrial machines.

In the display device of the numerical controller, for example, a simulation screen on the operation of an industrial device is displayed, and an interactive programming is edited. For example, an automatic programming/simulation device is indicated which receives an input of a coordinate position identified on a display screen so as to transfer to an editing screen of corresponding data.

Patent Document 1: Japanese Unexamined Patent Application, Publication No. 2002-91523

SUMMARY OF THE INVENTION

An automatic programming/simulation device disclosed in Patent Document 1 receives an input of a coordinate position identified on a display screen so as to transfer to a data editing screen for editing operation data. However, in the editing screen, a large number of items are provided. Hence, it takes much time for an operator to look for an item which is desired to be changed from a large number of items. The operator may erroneously select data from a large number of items and edit it. On the other hand, at present, in the display device of a numerical controller, for example, a display device such as a liquid crystal panel having a touch (position input) function is provided, and various types of information are displayed according to a touch operation performed by the operator.

An object of the present invention is to provide a numerical controller and a data editing method which can reduce time and errors in the editing of operation data.

(1) A numerical controller (for example, a "numerical controller 1" which will be described later) which uses a simulation screen displayed on a display unit (for example, a "touch panel 40" which will be described later) of the present invention so as to edit operation data of an industrial machine includes: an editing data storage unit (for example, an "editing data storage unit 32" which will be described later) that stores editing data in which an operation target and an operation type and setting screen data including an editing item are associated with each other; a touch operation reception unit (for example, a "touch operation reception unit 12" which will be described later) that receives a touch operation by a user on the simulation screen; an operation identifying unit (for example, an "operation identifying unit 13" which will be described later) that identifies the operation target and the operation type on the simulation screen by the touch operation received in the touch operation reception unit; a setting screen data extraction unit (for example, a "setting screen data extraction unit 15" which will be described later) that references the editing data storage unit so as to extract the setting screen data corresponding to the operation target and the operation type identified by the operation identifying unit; an editing processing unit (for example, an "editing processing unit 16" which will be described later) that edits the setting screen data extracted by the setting screen data extraction unit; and a setting screen output unit (for example, a "setting screen output unit 17" which will be described later) that outputs, to the display unit, the setting screen data after being edited by the editing processing unit.

(2) Preferably, in the numerical controller described in (1), the editing processing unit performs editing such that a value based on the operation data is set to the editing item of the setting screen data extracted by the setting screen data extraction unit.

(3) Preferably, in the numerical controller described in (2), the editing processing unit performs editing such that the editing item corresponding to the operation target and the operation type identified by the operation identifying unit is highlighted.

(4) Preferably, in the numerical controller described in (2), the editing processing unit performs editing such that a cursor is arranged on the editing item corresponding to the operation target and the operation type identified by the operation identifying unit.

(5) Preferably, the numerical controller described in any one of (1) to (4) includes: an editing data generation unit (for example, an "editing data generation unit 25" which will be described later) that generates the editing data based on tool information, machining shape information on a machining shape in a tool indicated by the tool information, machining path information on a machining path in the tool indicated by the tool information and the machining shape indicated by the machining shape information and operation type information on the operation type.

(6) Preferably, the numerical controller described in any one of (1) to (5) includes: a time position reception unit (for example, a "time position reception unit 21" which will be described later) that receives a time position indicating a time which elapses after the start of an operation with the operation data; and a simulation screen output unit (for example, a "simulation screen output unit 22" which will be described later) that outputs, to the display unit, the simulation screen corresponding to the time position received by the time position reception unit.

(7) Preferably, the numerical controller described in any one of (1) to (6) includes: an input reception unit (for example, an "input reception unit 18" which will be described later) that receives an input to the setting screen data after being edited which is output by the setting screen output unit; and an operation data correction unit (for example, an "operation data correction unit 19" which will be described later) that corrects the operation data based on the input received by the input reception unit.

(8) Preferably, the numerical controller described in any one of (1) to (7) includes: a guide processing unit (for example, a "guide processing unit 14" which will be described later) that outputs, when the operation type identified by the operation identifying unit is a specific operation, guide information on an operation for the identified operation target to the display unit.

(9) In a method of using a simulation screen of an industrial machine displayed on a display unit (for example, a "touch panel 40" which will be described later) of a computer serving as a numerical controller (for example, a "numerical controller 1" which will be described later) of the present invention so as to edit operation data of the industrial machine, the computer includes an editing data storage unit (for example, an "editing data storage unit 32" which will be described later) that stores editing data in which an operation target and an operation type and setting screen data including an editing item are associated with each other, and the computer includes: a touch operation reception step of receiving a touch operation by a user on the simulation screen; an operation identifying step of identifying the operation target and the operation type on the simulation screen by the received touch operation; a setting screen data extraction step of referencing the editing data storage unit so as to extract the setting screen data corresponding to the operation target and the operation type which are identified; an editing processing step of editing the extracted setting screen data; and a setting screen output step of outputting, to the display unit, the setting screen data after being edited.

(10) Preferably, the data editing method described in (9), the computer includes an editing data generation step of generating the editing data based on tool information, machining shape information on a machining shape in a tool indicated by the tool information, machining path information on a machining path in the tool indicated by the tool information and the machining shape indicated by the machining shape information and operation type information on the operation type.

According to the present invention, it is possible to provide a numerical controller and a data editing method which can reduce time and errors in the editing of operation data.

DETAILED DESCRIPTION OF THE INVENTION

Embodiment

An outline of an embodiment of the present invention will first be described. The present embodiment relates to a numerical controller which is an example of a controller that performs control on an industrial machine including at least a machine tool or a robot. The present embodiment relates to a numerical controller which can more accurately edit operation data for a short period of time.

[Numerical Controller 1]

Figure 1:
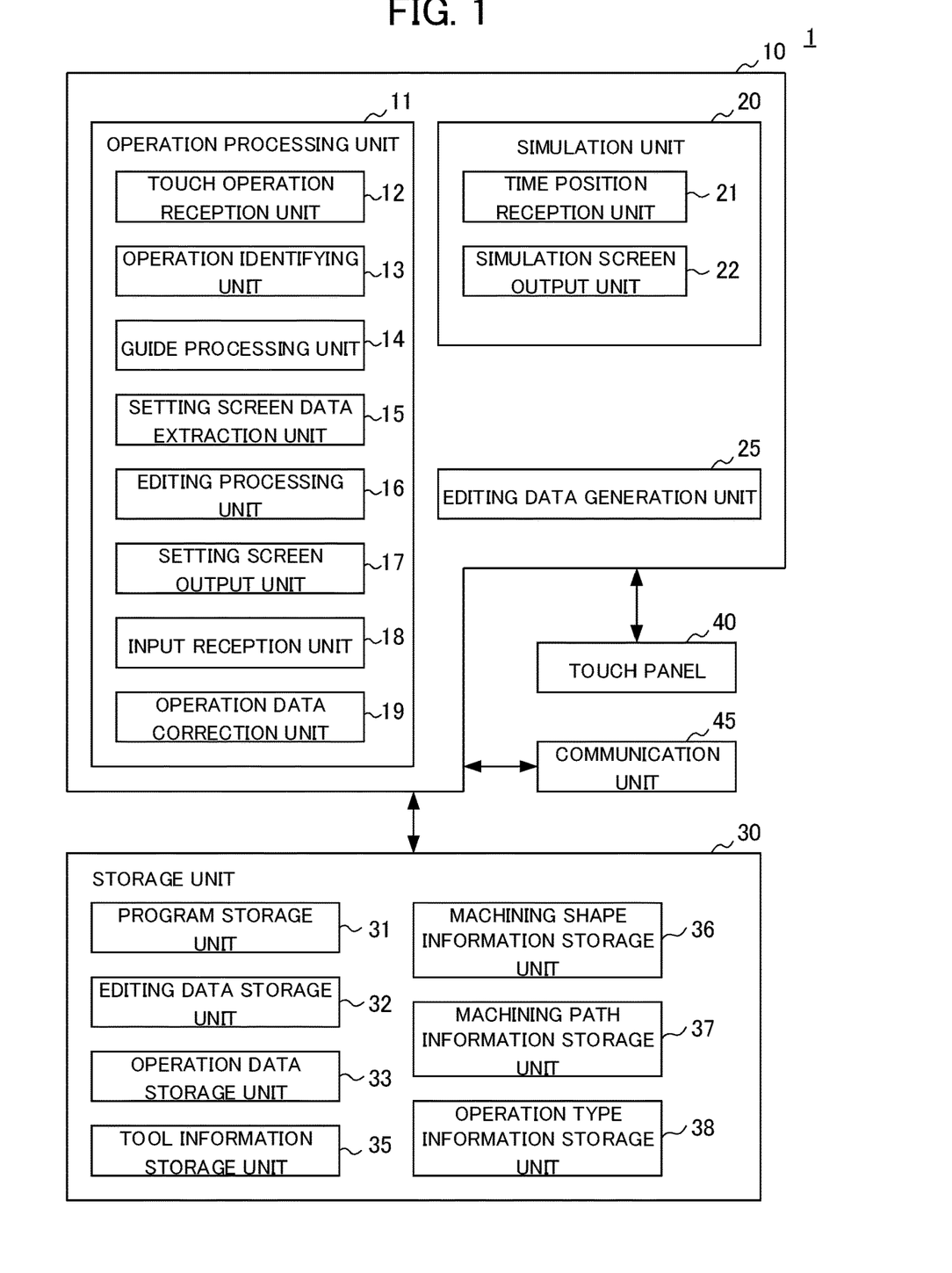
FIG. 1 is a block diagram of a numerical controller in the present embodiment.

A numerical controller 1 is a device which controls an industrial machine such as a machine tool or a robot connected to the numerical controller 1 so as to make the industrial machine perform a predetermined operation. Here, the numerical controller 1 will be described with reference to FIG. 1. FIG. 1 is a block diagram of the numerical controller 1 in the present embodiment. The numerical controller 1 includes a control unit 10, a storage unit 30, a touch panel 40 which serves as an input unit and a display unit and a communication unit 45.

The control unit 10 may be a CPU (central processing unit), and executes various types of programs stored in the storage unit 30 for controlling the numerical controller 1 so as to totally control the numerical controller 1. The control unit 10 includes an operation processing unit 11, a simulation unit 20 and an editing data generation unit 25. These function units are realized by the execution of programs stored in the storage unit 30 with the control unit 10. Although the numerical controller 1 includes, in addition to these function units, function units specific to the numerical controller 1, those are known by a person skilled in the art, and thus the description thereof will be omitted.

The operation processing unit 11 is a control unit on operation processing by an operator (user). The operation processing unit 11 includes a touch operation reception unit 12, an operation identifying unit 13, a guide processing unit 14, a setting screen data extraction unit 15, an editing processing unit 16, a setting screen output unit 17, an input reception unit 18 and an operation data correction unit 19.

The touch operation reception unit 12 receives a touch operation of the operator through the touch panel 40. The touch operation reception unit 12 receives, as the touch operation, a touch position and the movement conditions of the position and time of movement of a touch from the touch position. Here, the touch position is indicated by, for example, the coordinate position of the touch panel 40. The movement conditions are indicated by the displacement of the movement from the touch position, and include the number of simultaneous touches.

The operation identifying unit 13 identifies, from the touch position and the movement conditions, an operation target and an operation type on a simulation screen. More specifically, the operation identifying unit 13 identifies, as the operation target, a displayed item corresponding to the touch position on the simulation screen. The operation type corresponds to the movement conditions, and examples thereof include dragging, pinching-in/pinching-out and a long press. The guide processing unit 14 displays, as guide information, on the touch panel 40, for guiding, the operation type which can be performed on the operation target identified by the operation identifying unit 13 and the details of setting screen data.

The setting screen data extraction unit 15 extracts, from an editing data storage unit 32, the setting screen data corresponding to the operation target and the operation type identified by the operation identifying unit 13. The setting screen data includes a screen for correcting the operation data and an editing item which can be corrected on the screen. The editing processing unit 16 edits the setting screen data extracted by the setting screen data extraction unit 15. More specifically, the editing processing unit 16 performs editing such that a value based on the operation data is added to the editing item of the extracted setting screen data and that thus a display form is changed. Here, for example, the change of the display form refers to highlighting such as the coloring of the value of the editing item corresponding to the operation target and the operation type or the boldfacing of the value of the editing item. The change of the display form includes, for example, the arrangement of a cursor on the editing item corresponding to the operation target and the operation type.

The setting screen output unit 17 outputs, to the touch panel 40, the setting screen data after being edited by the editing processing unit 16. Here, the setting screen output unit 17 may superimpose, on the simulation screen, for example, a screen which is provided as another window based on the setting screen data. The setting screen output unit 17 may display, instead of the simulation screen, the screen based on the setting screen data. Furthermore, the setting screen output unit 17 may display the screen based on the setting screen data side by side with the simulation screen.

The input reception unit 18 receives correction input data which is input by the operator on the screen based on the setting screen data that is output. The operation data correction unit 19 performs correction such that the correction input data received by the input reception unit 18 is reflected on the operation data.

The simulation unit 20 is a control unit which generates simulation screen data based on the operation data and which outputs it to the touch panel 40. The simulation unit 20 includes a time position reception unit 21 and a simulation screen output unit 22. The time position reception unit 21 receives a time position after the start of a simulation on the simulation screen. The time position reception unit 21 may receive, as the time position, a time (for example, one second) which elapses after the start of the simulation. The time position reception unit 21 may also receive, as the time position, an operation step. The simulation screen output unit 22 outputs, to the touch panel 40, the simulation screen data obtained by simulating the operation data in the time position received by the time position reception unit 21.

The editing data generation unit 25 generates the editing data based on tool information which is stored in a tool information storage unit 35, machining shape information which is stored in a machining shape information storage unit 36, machining path information which is stored in a machining path information storage unit 37 and operation type information which is stored in an operation type information storage unit 38. Here, the tool information includes, for example, data such as dimensions of tools. The machining shape information and the machining path information include, for example, cutting condition data which is set according to a material for each of the tools.

The storage unit 30 is a storage region which stores programs and the like executed by the control unit 10. The storage unit 30 includes a program storage unit 31, the editing data storage unit 32, an operation data storage unit 33, the tool information storage unit 35, the machining shape information storage unit 36, the machining path information storage unit 37 and the operation type information storage unit 38.

The program storage unit 31 stores various types of programs which are executed by the control unit 10 of the numerical controller 1. The program storage unit 31 stores the programs for performing various types of functions of the control unit 10 described above. The editing data storage unit 32 stores the editing data generated by the editing data generation unit 25. The operation data storage unit 33 stores the operation data. Here, the operation data is previously produced and stored in the operation data storage unit 33.

The tool information storage unit 35 stores the tool information. Here, the tool information refers to information which is previously set on a tool setting screen (not shown) included in the numerical controller 1. The machining shape information storage unit 36 stores the machining shape information. Here, the machining shape information refers to information which is previously set on a machining shape input screen (not shown) included in the numerical controller 1. The machining path information storage unit 37 stores the machining path information. Here, the machining path information refers to information which is previously generated with a machining path generation unit (not shown) included in the numerical controller 1. The operation type information storage unit 38 stores the operation type information. Here, the operation type information refers to information of the operation type on the touch operation.

The touch panel 40 plays both roles of a function serving as an input unit which receives the touch operation performed with a finger of the operator and a function serving as a display unit. The communication unit 45 is an interface through which to communicate with the industrial machine and the like.

[Editing Data Generation Processing]

Figure 2:
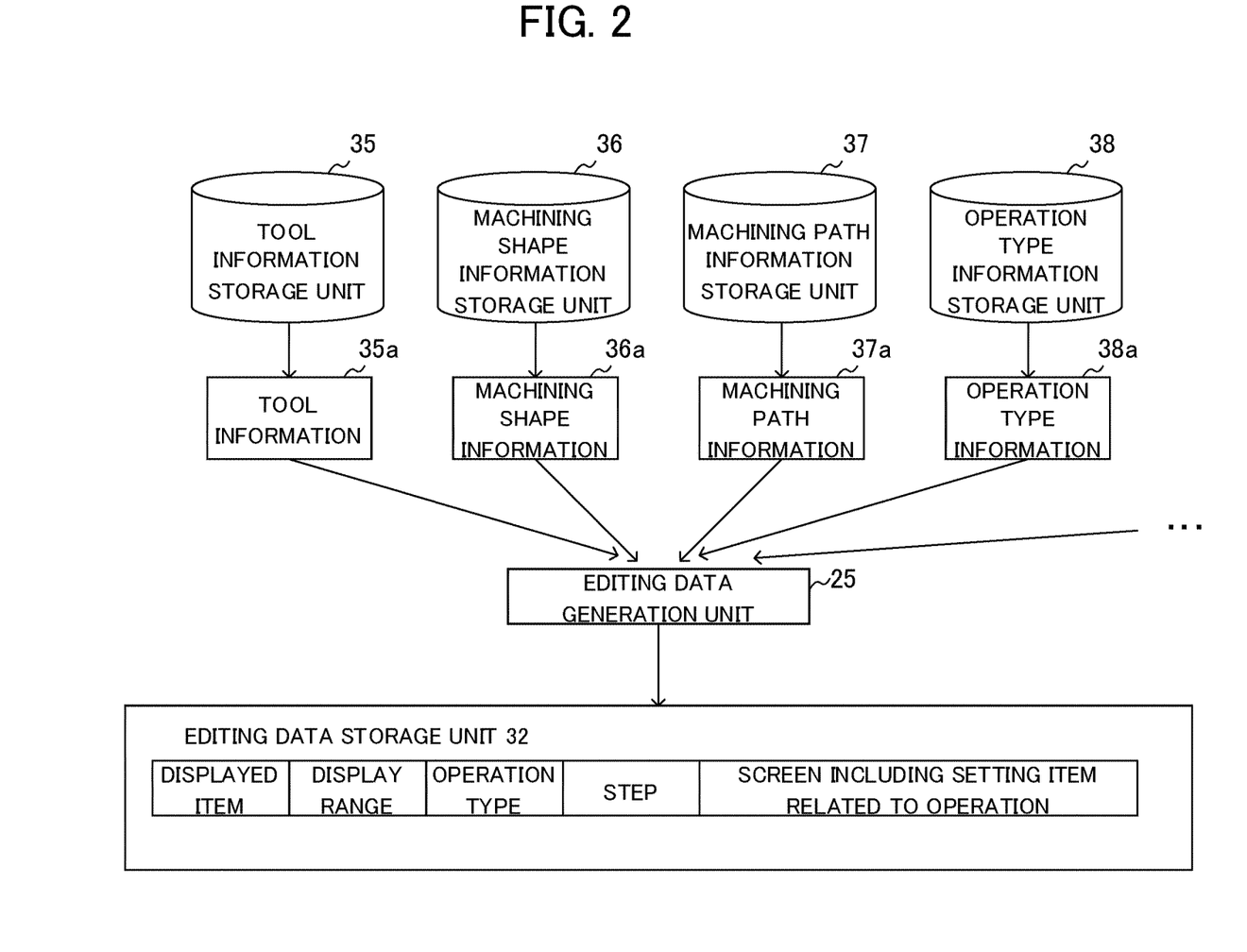
FIG. 2 is a diagram for illustrating the generation of editing data in the numerical controller in the present embodiment.

Editing data generation processing in the numerical controller 1 will then be described. FIG. 2 is a diagram for illustrating the generation of the editing data in the numerical controller 1 in the present embodiment. The control unit 10 (the editing data generation unit 25) of the numerical controller 1 generates the editing data based on various types of information including the tool information 35*a* stored in the tool information storage unit 35, the machining shape information 36*a* stored in the machining shape information storage unit 36, the machining path information 37*a* stored in the machining path information storage unit 37 and the operation type information 38*a* stored in the operation type information storage unit 38. Here, the editing data generated by the editing data generation unit 25 includes individual items of the displayed item, a display range, the operation type, a step and a screen including a setting item (editing item) related to the operation. Here, the display range of the displayed item is a range including the displayed item and is indicated by a rectangular shape, and can be indicated by, for example, the coordinates of four points with the upper left corner of the display screen set to (0, 0).

A user (the user here is not the operator but, for example, a person who produces the program of the numerical controller 1) uses, for example, an interactive program to specify the individual items such that they are associated with each other, and thus the editing data generation unit 25 generates the editing data. Specifically, the interactive program is first executed, and thus the user specifies the displayed item from the displayed screen (not shown), with the result that the editing data generation unit 25 sets the display range. Then, the user selects the operation type from the operation type information storage unit 38, and thus the editing data generation unit 25 associates the displayed item with the operation type. Furthermore, for example, the user selects the setting screen, and thus the editing data generation unit 25 generates the editing data in which these types of information are associated with each other. The editing data generation unit 25 may automatically perform part of the associating. Then, the control unit 10 stores, in the editing data storage unit 32, the editing data generated by the editing data generation unit 25.

Figure 3:
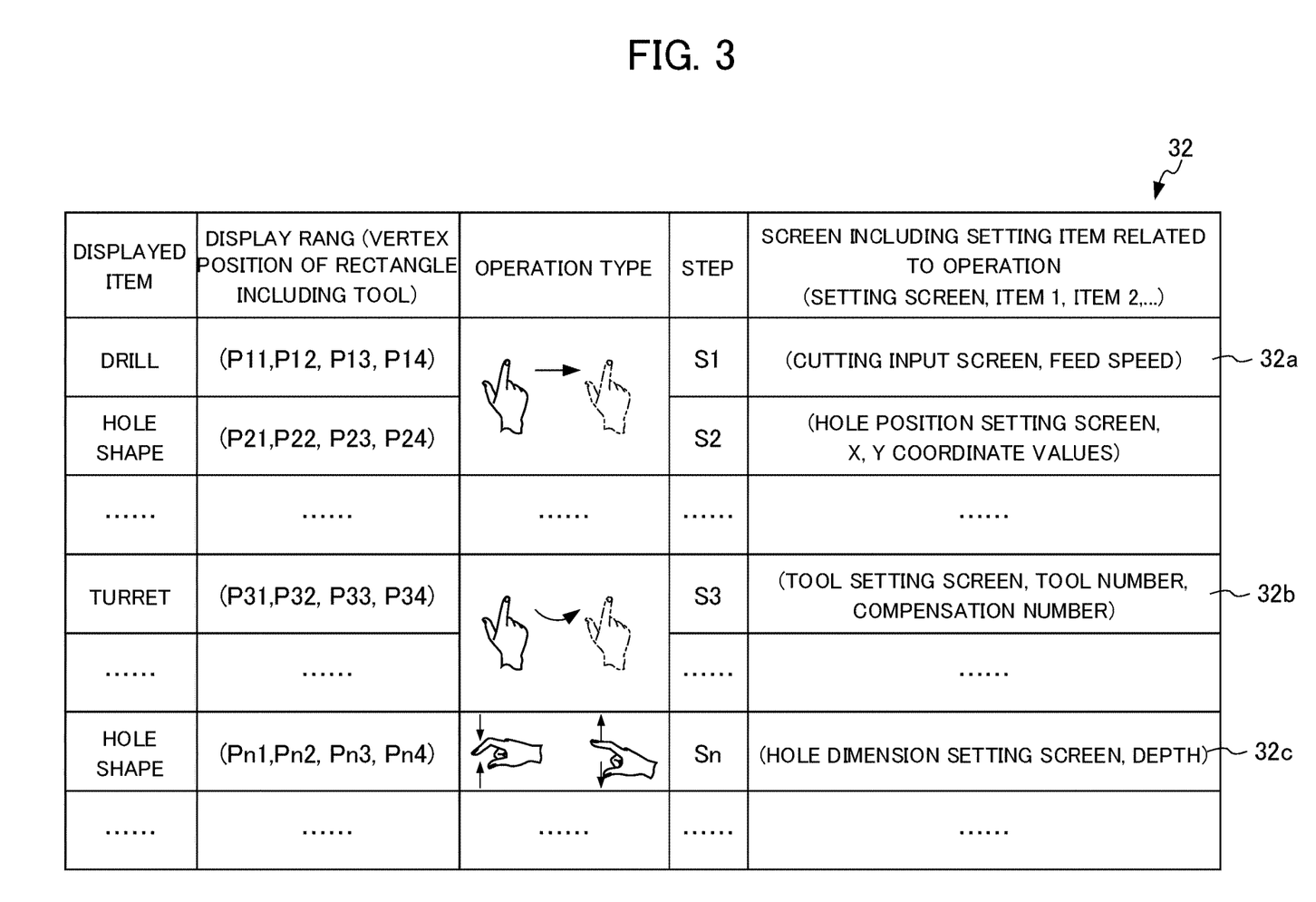
FIG. 3 is a diagram showing an example of the editing data storage unit of the numerical controller in the present embodiment.

Here, a specific example of the editing data stored in the editing data storage unit 32 will be described with reference to FIG. 3. FIG. 3 is a diagram showing an example of the editing data storage unit 32 of the numerical controller 1 in the present embodiment. For example, editing data 32a indicates that when the displayed item is a drill, the touch operation is linear dragging in a lateral direction and the step is SI, the item of a feed speed on a cutting input screen is a target to be corrected. Moreover, editing data 32b indicates that when the displayed item is a turret, the touch operation is curved dragging in the lateral direction and the step is S3, the items of a tool number and a compensation number on a tool setting screen are targets to be corrected. Furthermore, editing data 32c indicates that when the displayed item is a hole shape, the touch operation is pinching-in or pinching-out in a longitudinal direction and the step is Sn (n is a natural number), the item of a depth on a hole dimension setting screen is a target to be corrected.

As described above, in the numerical controller 1, it is possible to generate the editing data in which the displayed items and the operation types and the setting screen data including the editing items are associated with each other. Hence, in an operation by the operator which will be subsequently described, the editing data can be used.

[Processing by Operator]

Figure 4:
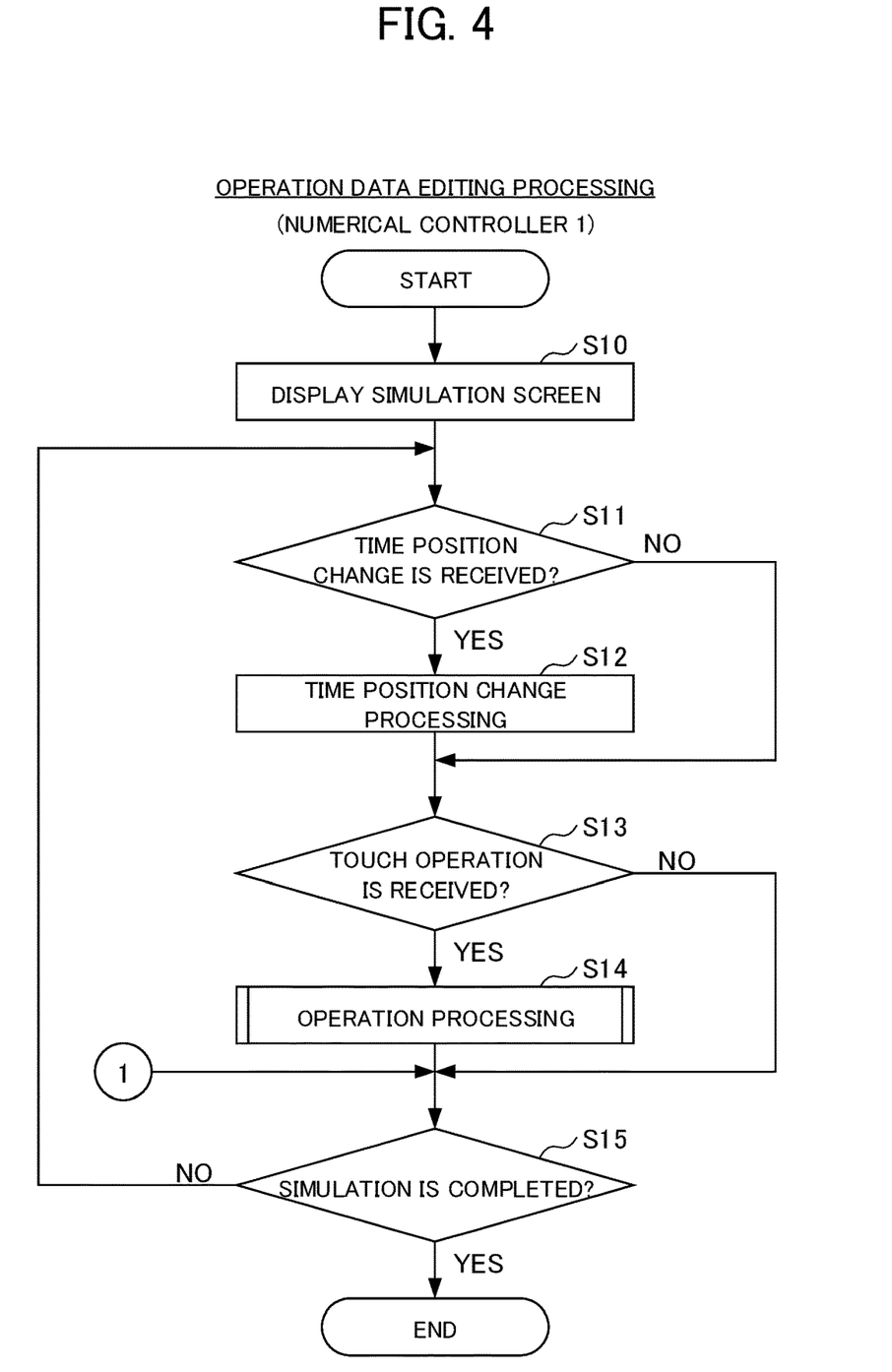
FIG. 4 is a flowchart showing operation data editing processing in the numerical controller in the present embodiment.
Figure 5:
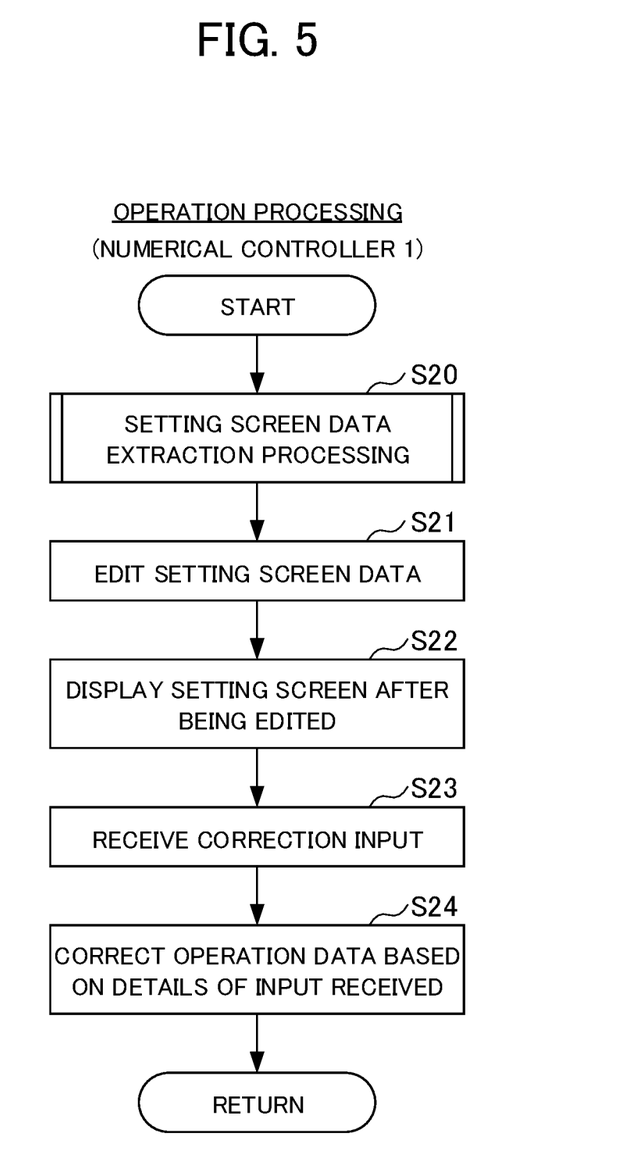
FIG. 5 is a flowchart showing operation processing in the numerical controller in the present embodiment.
Figure 6:
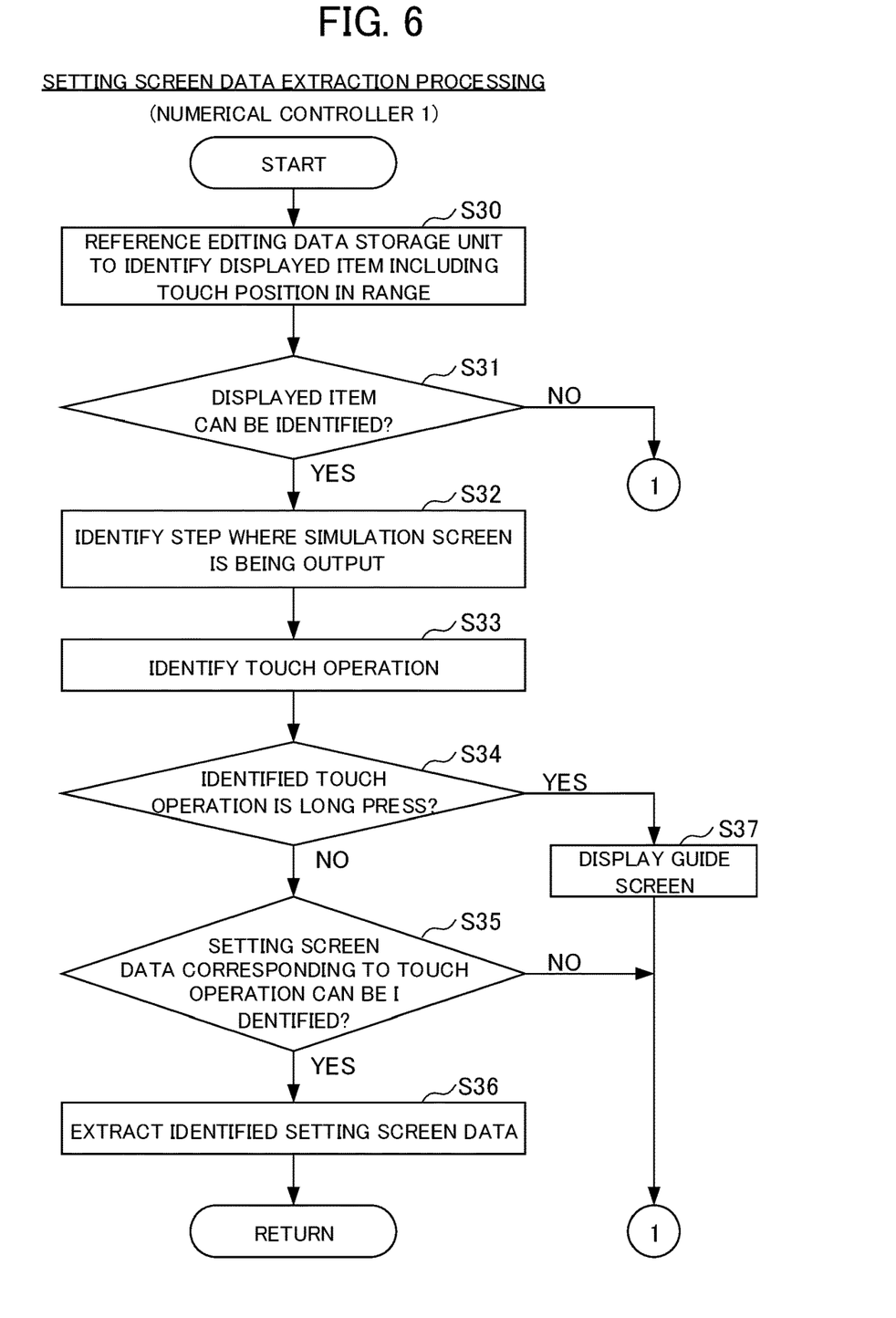
FIG. 6 is a flowchart showing setting screen data extraction processing in the numerical controller in the present embodiment.

Editing of the operation data on the simulation screen will then be described. FIG. 4 is a flowchart showing operation data editing processing in the numerical controller 1 in the present embodiment. FIG. 5 is a flowchart showing operation processing in the numerical controller 1 in the present embodiment. FIG. 6 is a flowchart showing setting screen data extraction processing in the numerical controller 1 in the present embodiment.

In step S10 (hereinafter, step S is simply referred to as S) of FIG. 4, the control unit 10 (the simulation unit 20) generates the simulation screen based on the operation data stored in the operation data storage unit 33.

Then, the control unit 10 (the simulation unit 20) outputs the generated simulation screen to the touch panel 40. In S11, the control unit 10 (the time position reception unit 21) determines whether or not a time position change is received. The control unit 10 receives the time position change by, for example, inputting the corresponding operation step to the screen (not shown) to which the operation step is input. When the control unit 10 receives the time position change (S11: yes), the control unit 10 transfers the processing to S12. On the other hand, when the control unit 10 does not receive the time position change (S11: no), the control unit 10 transfers the processing to S13.

In S12, the control unit 10 (the simulation screen output unit 22) performs time position change processing. Specifically, the control unit 10 outputs, instead of the simulation screen which is currently output, the simulation screen whose time position is changed to the received time position. In S13, the control unit 10 (the touch operation reception unit 12) determines, by the detection of the touch operation with the touch panel 40, whether or not the touch operation is received. When the touch operation is received (S13: yes), the control unit 10 transfers the processing to S14. On the other hand, when the touch operation is not received (S13: no), the control unit 10 transfers the processing to S15. In S14, the control unit 10 (the operation processing unit 11) performs operation processing.

Here, the operation processing will be described with reference to FIG. 5. In S20 of FIG. 5, the control unit 10 (the operation processing unit 11) performs setting screen data extraction processing.

Here, the setting screen data extraction processing will be described with reference to FIG. 6. In S30 of FIG. 6, the control unit 10 (the operation identifying unit 13) references the editing data storage unit 32 so as to identify the displayed item which includes the touch position in its range. The control unit 10 identifies the displayed item which includes, in its display range, the coordinate position where the touch operation is detected. In S31, the control unit 10 (the operation identifying unit 13) determines whether or not the displayed item can be identified. When no display range is included in the coordinate position where the touch operation is detected, the control unit 10 cannot identify the displayed item. When the control unit 10 can identify the displayed item (S31: yes), the control unit 10 transfers the processing to S32. On the other hand, when control unit 10 cannot identify the displayed item (S31: no), the control unit 10 transfers the processing to S15 of FIG. 14. The control unit 10 may output, to the touch panel 40, information indicating that the operation target cannot be identified.

In S32, the control unit 10 (the operation identifying unit 13) identifies the step which is output by the simulation screen. For example, when the time position change is received, the control unit 10 identifies the step corresponding to the received time position as the step output by the simulation screen. The control unit 10 may identify the step based on the information of a time which elapses after the start of the simulation screen.

In S33, the control unit 10 (the operation identifying unit 13) detects the touch operation based on the detection of the touch panel 40. For example, when the control unit 10 simultaneously detects a plurality of touches, the control unit 10 identifies the touch operation such as pinching-in or pinching-out by a displacement in the following movement of a plurality of detection positions. For example, when the control unit 10 detects one touch operation, the control unit 10 identifies the touch operation by touching with one finger such as tapping, double-tapping, a long press, dragging, swiping or flicking by a displacement in the following movement of a detection position over an elapsed time.

In S34, the control unit 10 (the operation identifying unit 13) determines whether or not the identified touch operation is a long press (specific operation). When the touch operation is a long press (S34: yes), the control unit 10 transfers the processing to S37. On the other hand, when the touch operation is not a long press (S34: no), the control unit 10 transfers the processing to S35.

In S35, the control unit 10 (the operation identifying unit 13) references the editing data storage unit 32 so as to determine whether or not the setting screen data corresponding to the touch operation can be identified. When the setting screen data corresponding to the touch operation can be identified (S35: yes), the control unit 10 transfers the processing to S36. On the other hand, when the setting screen data corresponding to the touch operation cannot be identified (S35: no), the control unit 10 transfers the processing to S15 of FIG. 4. The control unit 10 may output, to the touch panel 40, information indicating that the screen corresponding to the operation cannot be identified. In S36, the control unit 10 (the setting screen data extraction unit 15) extracts the identified setting screen data from the editing data storage unit 32. Thereafter, the control unit 10 transfers the processing to S21 of FIG. 5.

In S37, the control unit 10 (the guide processing unit 14) extracts, from the editing data storage unit 32, the operation type which can be operated with the operation target serving as the identified display unit, edits the operation type, and outputs it as a guide screen to the touch panel 40. Thereafter, the control unit 10 transfers the processing to S15 of FIG. 4.

With reference back to FIG. 5, in S21, the control unit 10 (the editing processing unit 16) edits the extracted setting screen data. The control unit 10 first adds a value based on the operation data to the editing item of the extracted setting screen data. Then, the control unit 10 changes the display form of the value of the editing item corresponding to the operation target and the operation type. Here, various methods for changing the display form are present. Examples of the change of the display form include the arrangement of the cursor on the corresponding editing item, the coloring of the frame of the corresponding editing item, the boldfacing of the value of the corresponding editing item and the coloring thereof. These are all intended to highlight the corresponding editing item. The display form is not limited to these examples. A plurality of display forms may be combined together.

Figure 8B:
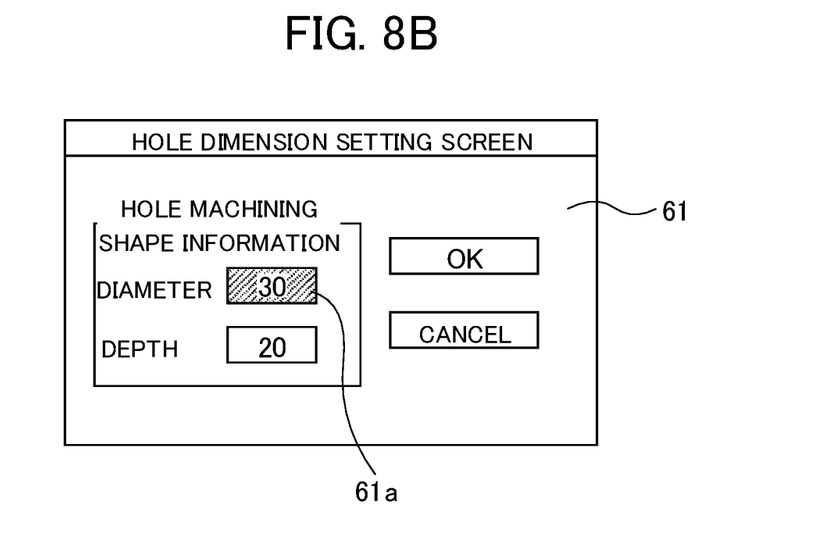
FIG. 8B is a diagram showing an example of the setting screen displayed in the numerical controller in the present embodiment.

Here, processing for extracting and editing the setting screen data so as to output the setting screen will be described using a specific example. FIGS. 7A to 10A are diagrams showing examples of the simulation screen 50 displayed in the numerical controller 1 in the present embodiment. FIG. 7B is a diagram showing an example of a hole dimension setting screen 60 displayed in the numerical controller 1 in the present embodiment. FIG. 8B is a diagram showing an example of a hole dimension setting screen 61 displayed in the numerical controller 1 in the present embodiment. FIG. 9B is a diagram showing an example of a hole position setting screen 62 displayed in the numerical controller 1 in the present embodiment. FIG. 10B is a diagram showing an example of a guide screen 70 displayed in the numerical controller 1 in the present embodiment.

Figure 7A:
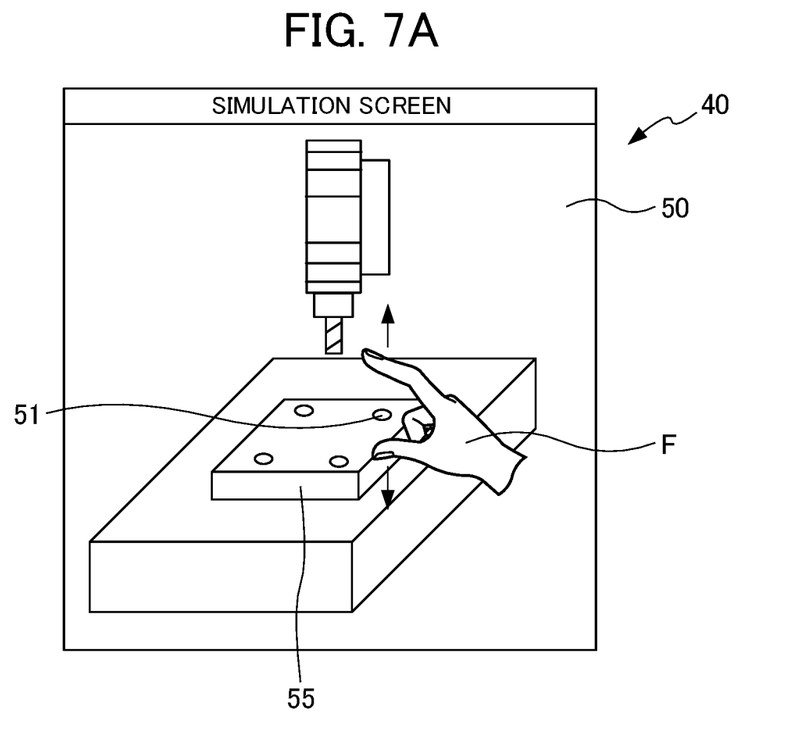
FIG. 7A is a diagram showing an example of a simulation screen displayed in the numerical controller in the present embodiment.
Figure 7B:
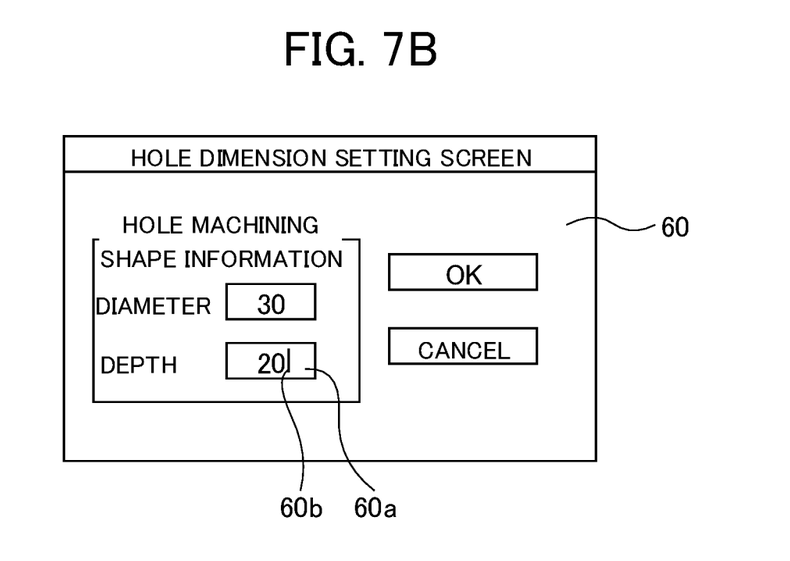
FIG. 7B is a diagram showing an example of a setting screen displayed in the numerical controller in the present embodiment.

FIG. 7A shows an example of the simulation screen 50. The simulation screen 50 is displayed on the touch panel 40. In this simulation screen 50, the machine tool which is the industrial machine is in the middle of simulating the machining of a workpiece 55. The actual finger F of the operator performs, on the touch panel 40, a touch operation of carrying out pinching-out in the longitudinal direction on a hole shape 51 in the workpiece 55 on the simulation screen 50. By the touch operation with the finger F of the operator, the control unit 10 identifies the hole shape 51 in the touch position (S30 of FIG. 6). Then, the control unit 10 references, from the step and the touch operation on the simulation screen 50, the editing data storage unit 32 so as to identify and edit the setting screen data (S32 to S36 of FIG. 6, S21 of FIG. 5). Here, the operation on the operation target in FIG. 7A corresponds to the editing data 32c in FIG. 3. The control unit 10 identifies the hole dimension setting screen 60 so as to add values based on the operation data to the diameter and the depth of hole machining shape information as shown in FIG. 7B. The control unit 10 arranges the cursor 60b on the item of the depth 60a.

Figure 8A:
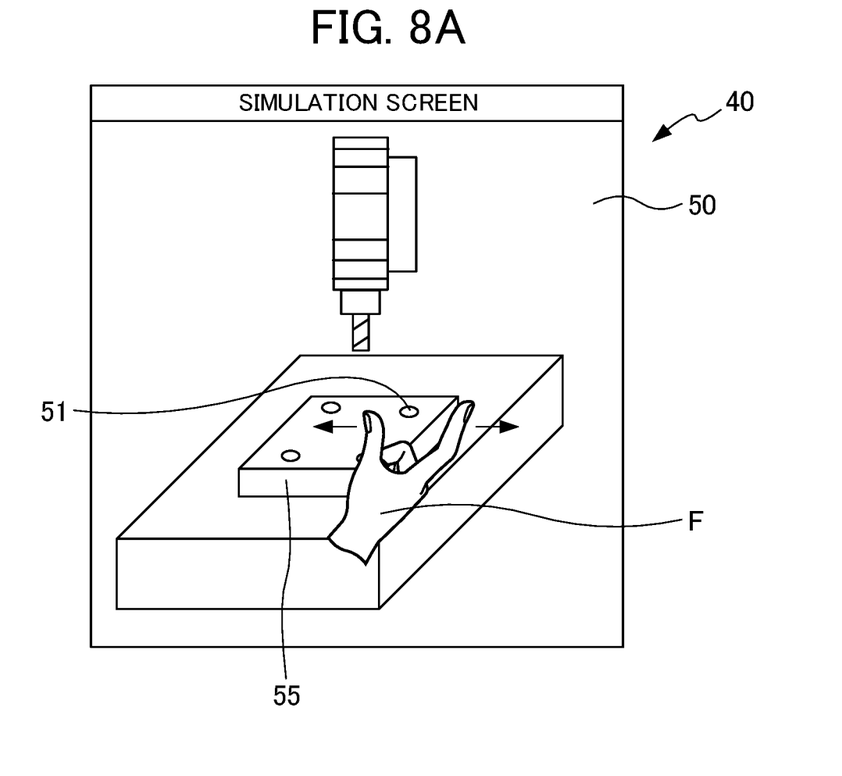
FIG. 8A is a diagram showing an example of the simulation screen displayed in the numerical controller in the present embodiment.

FIG. 8A shows an example of the same simulation screen 50, and the finger F of the operator performs a touch operation of carrying out pinching-out in the lateral direction on the hole shape 51 in the workpiece 55 on the simulation screen 50. In this case, by the touch operation with the finger F of the operator, the control unit 10 identifies the hole shape 51 in the touch position (S30 of FIG. 6). Then, the control unit 10 references, from the step and the touch operation on the simulation screen 50, the editing data storage unit 32 so as to identify and edit the setting screen data (S32 to S36 of FIG. 6, S21 of FIG. 5). Specifically, the control unit 10 identifies the hole dimension setting screen 61 so as to add values based on the operation data to the diameter and the depth of hole machining shape information as shown in FIG. 8B. The control unit 10 also colors the item of the diameter 61a (in FIG. 8B, the coloring is indicated by hatching).

In FIGS. 7A and 7B and FIGS. 8A and 8B, the operations of specifying the same hole shape 51 on the simulation screen 50 are described. In FIG. 7A, the operator pinches out the finger F in the longitudinal direction, and in FIG. 8A, the operator pinches out the finger F in the later direction. When the operator pinches out the finger F in the longitudinal direction, the control unit 10 changes the display form of the item of the depth so that the depth is changed. On the other hand, when the operator pinches out the finger F in the lateral direction, the control unit 10 changes the display form of the item of the diameter so that the diameter is changed.

As described above, in the numerical controller 1, the details which are set correspond to the intuitive operations performed by the operator with the finger F. In the numerical controller 1, the items whose display forms are changed also correspond to the intuitive operations performed by the operator with the finger F. Then, the control unit 10 can display the items whose display forms are changed such that the operator easily understands them.

Figure 9A:
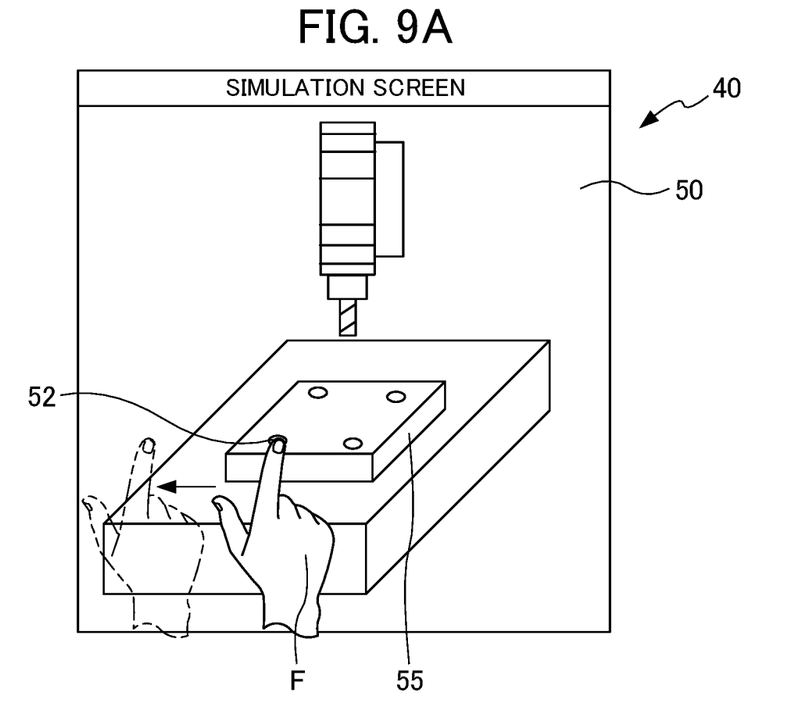
FIG. 9A is a diagram showing an example of the simulation screen displayed in the numerical controller in the present embodiment.
Figure 9B:
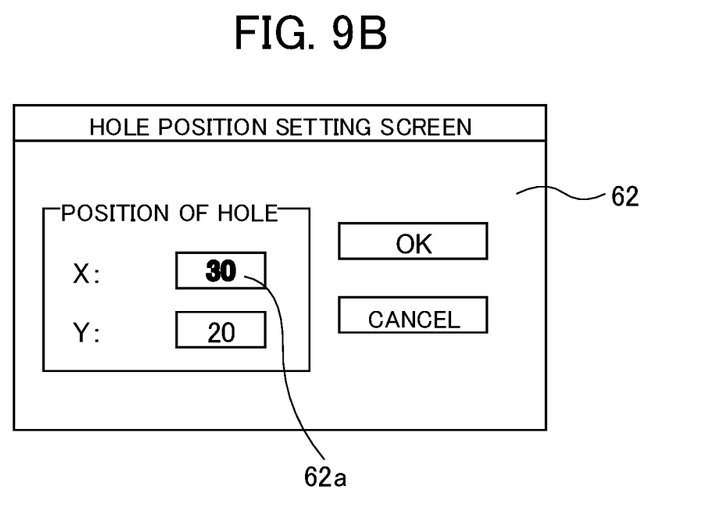
FIG. 9B is a diagram showing an example of the setting screen displayed in the numerical controller in the present embodiment.

FIG. 9A shows an example of the same simulation screen 50, and the finger F of the operator performs a touch operation of carrying out dragging so as to slide in a leftward direction on another hole shape 52 in the workpiece 55 on the simulation screen 50. In this case, by the touch operation with the finger F of the operator, the control unit 10 identifies the hole shape 52 in the touch position (S30 of FIG. 6). Then, the control unit 10 references, from the step and the touch operation on the simulation screen 50, the editing data storage unit 32 so as to identify and edit the setting screen data (S32 to S36 of FIG. 6, S21 of FIG. 5). Specifically, the control unit 10 identifies the hole position setting screen 62 so as to add, as shown in FIG. 9B, values based on the operation data to X and Y in the position of the hole. The control unit 10 boldfaces the value in the item of X 62a.

Then, the control unit 10 displays, on the touch panel 40, the hole position setting screen 62 after being edited.

Figure 10A:
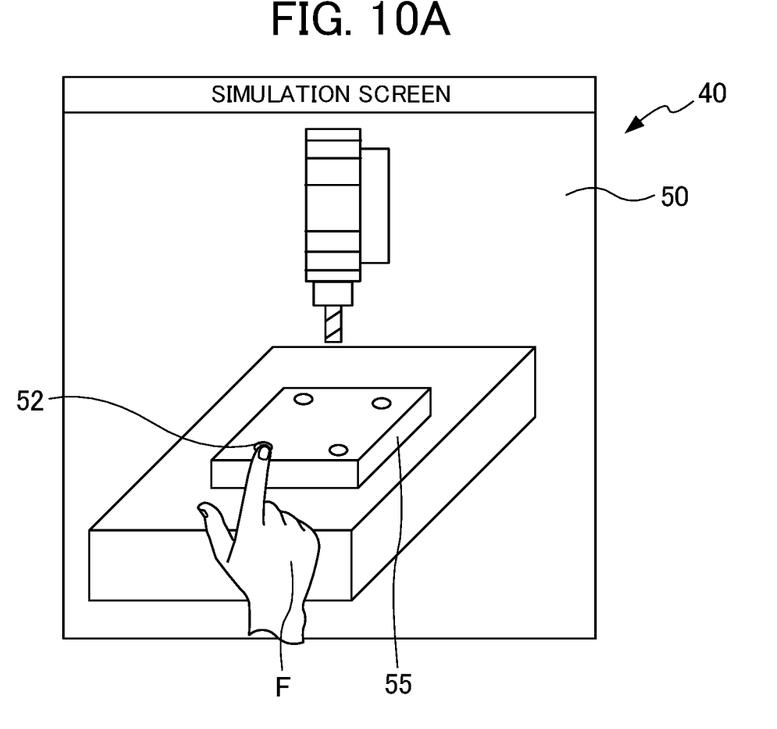
FIG. 10A is a diagram showing an example of the simulation screen displayed in the numerical controller in the present embodiment.
Figure 10B:
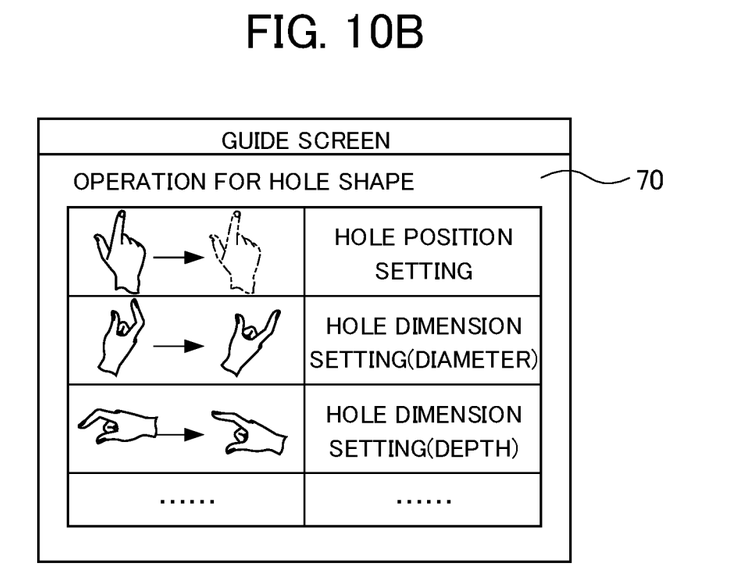
FIG. 10B is a diagram showing an example of a guide screen displayed in the numerical controller in the present embodiment.

FIG. 10A shows an example of the same simulation screen 50, and the finger F of the operator performs a touch operation of carrying out a long press on another hole shape 52 in the workpiece 55 on the simulation screen 50. In this case, by the touch operation with the finger F of the operator, the control unit 10 identifies the hole shape 52 in the touch position (S30 of FIG. 6). Then, since the touch operation is a long press, the control unit 10 edits and displays the guide screen from the step and the touch operation on the simulation screen 50 (S32 to S34 and S37 of FIG. 6). Specifically, the control unit 10 references the editing data storage unit 32 so as to extract and edit the screen which is a hole shape and which can be set in the corresponding step and the touch operation. Then, the control unit 10 displays, on the touch panel 40, the guide screen 70 after being edited as shown in FIG. 10B.

As described above, in the numerical controller 1, when the specific operation performed with the finger F of the operator is received, the operation which can be performed on the displayed item and the details of the setting are displayed for guiding. Hence, even when the operator is an inexperienced person, the operator can perform the operation by the display of guiding, and thus enhanced convenience can be provided.

With reference back to FIG. 5, in S22, the control unit 10 (the setting screen output unit 17) outputs the setting screen data after being edited to the touch panel 40. In S23, the control unit 10 (the input reception unit 18) receives a correction input. Specifically, for example, on the hole dimension setting screen 60 shown in FIG. 7B, the value in the item of the depth 60a is corrected, thereafter an "OK" button is selected and thus the control unit 10 receives the correction input for the editing item. In S24, the control unit 10 (the operation data correction unit 19) corrects the operation data based on the details of the input which is received. Thereafter, the control unit 10 transfers the processing to S15 of FIG. 4.

In S15 of FIG. 4, the control unit 10 determines whether or not to complete the simulation. The control unit 10 determines to complete the simulation not only when the simulation itself is completed but also when an operation of completing the simulation by the operator is received. When the simulation is completed (S15: yes), the control unit 10 completes the present processing. On the other hand, when the simulation is not completed (S15: no), the control unit 10 transfers the processing to S11.

As described above, the control unit 10 of the numerical controller 1 displays the setting screen corresponding to the touch operation, and receives the correction input for the value in the editing item so as to correct the operation data. Consequently, when the simulation screen is subsequently output, the control unit 10 of the numerical controller 1 can output the simulation screen on which the details of the correction are reflected. Hence, in the numerical controller 1, it is possible to correct the operation data easily and accurately. Specifically, on the setting screen output to the touch panel 40 of the numerical controller 1, the display form of the editing item corresponding to the touch operation is changed to a form which is easily operated or to a form which is more highlighted. Consequently, for the operator, it is possible to prevent an error in the operation, and it is possible to easily find the item.

Programs used in the present invention can be stored in various types of non-transitory computer readable media and supplied to computers. The non-transitory computer readable media include various types of tangible storage media. Examples of the non-transitory computer readable media include magnetic recording media (for example, a flexible disk, a magnetic tape and a hard disk drive), magneto-optical recording media (for example, a magneto-optical disc), a CD-ROM (Read Only Memory), a CD-R, a CD-R/W, semiconductor memories (for example, a mask ROM and a PROM (programmable ROM), an EPROM (Erasable PROM), a flash ROM and a RAM (random access memory)). The programs may also be supplied to computers with various types of transitory computer readable media. Examples of the transitory computer readable media include an electrical signal, an optical signal and electromagnetic waves. The transitory computer readable media can supply the programs to computers through a wired communication path such as an electric wire or an optical fiber or a wireless communication path.

Although the embodiment described above is a preferred embodiment of the present invention, the scope of the present invention is not limited to only the embodiment described above, and embodiments in which various modifications are made can be practiced without departing from the spirit of the present invention.

(Variation 1)

Although in the embodiment discussed above, the example where the time position is received as the step is described, there is no limitation to this example. A time which elapses after the start of the operation of the simulation may be received as the time position.

(Variation 2)

Although in the embodiment discussed above, the example where when a long press is performed, the guide screen on the displayed item in the position of the long press is displayed is described, there is no limitation to this example. When another specific operation different from a long press is operated, the guide screen may be displayed. By performing a touch operation in a predetermined position (for example, the upper right corner of the screen), a guide for operating the displayed item which is a step displayed on the simulation screen and which can be corrected may be output.

(Variation 3)

Although in the embodiment discussed above, the description is given using the numerical controller as the example, there is no limitation to this example. As long as a controller performs control on an industrial machine including at least a machine tool or a robot, for example, a robot controller or the like may be used.

EXPLANATION OF REFERENCE NUMERALS

1 numerical controller
10 control unit
11 operation processing unit
12 touch operation reception unit
13 operation identifying unit
14 guide processing unit
15 setting screen data extraction unit
16 editing processing unit
17 setting screen output unit
18 input reception unit
19 operation data correction unit
20 simulation unit
21 time position reception unit
22 simulation screen output unit
25 editing data generation unit
30 storage unit
32 editing data storage unit
40 touch panel (display unit)

What is claimed is:

1. A numerical controller that uses a simulation screen displayed on a display unit so as to edit operation data of an industrial machine, the numerical controller comprising:

an editing data storage unit that stores editing data in which (i) an operation target and an operation type and (ii) setting screen data are associated with each other, the operation type being related to a touch operation, the setting screen data including a screen for correcting the operation data, and the setting screen data including an editing item which can be corrected on the screen;

a touch operation reception unit that receives a touch operation by a user on the simulation screen;

an operation identifying unit that identifies the operation target and the operation type on the simulation screen by the touch operation received in the touch operation reception unit;

a setting screen data extraction unit that references the editing data storage unit so as to extract the setting screen data corresponding to the operation target and the operation type identified by the operation identifying unit;

an editing processing unit that edits the setting screen data extracted by the setting screen data extraction unit;

a setting screen output unit that outputs, to the display unit, the setting screen data after being edited by the editing processing unit; and an editing data generation unit that generates the editing data based on tool information, machining shape information on a machining shape in a tool indicated by the tool information, machining path information on a machining path in the tool indicated by the tool information and the machining shape indicated by the machining shape information and operation type information on the operation type.

2. The numerical controller according to claim 1, wherein the editing processing unit performs editing such that a value based on the operation data is set to the editing item of the setting screen data extracted by the setting screen data extraction unit.

3. The numerical controller according to claim 2, wherein the editing processing unit performs editing such that the editing item corresponding to the operation target and the operation type identified by the operation identifying unit is highlighted.

4. The numerical controller according to claim 2, wherein the editing processing unit performs editing such that a cursor is arranged on the editing item corresponding to the operation target and the operation type identified by the operation identifying unit.

5. The numerical controller according to claim 1, comprising:
a time position reception unit that receives a time position indicating a time which elapses after start of an operation with the operation data; and a simulation screen output unit that outputs, to the display unit, the simulation screen corresponding to the time position received by the time position reception unit.

6. The numerical controller according to claim 1, comprising:
an input reception unit that receives an input to the setting screen data after being edited which is output by the setting screen output unit; and
an operation data correction unit that corrects the operation data based on the input received by the input reception unit.

7. The numerical controller according to claim 1, comprising:
a guide processing unit that outputs, when the operation type identified by the operation identifying unit is a specific operation, guide information on an operation for the identified operation target to the display unit.

8. A data editing method of using a simulation screen of an industrial machine displayed on a display unit of a computer serving as a numerical controller so as to edit operation data of the industrial machine,
wherein the computer includes an editing data storage unit that stores editing data in which (i) an operation target and an operation type and (ii) setting screen data are associated with each other, the operation type being related to a touch operation, the setting screen data including a screen for correcting the operation data, and the setting screen data including an editing item which can be corrected on the screen;
the computer includes:
a touch operation reception step of receiving a touch operation by a user on the simulation screen;
an operation identifying step of identifying the operation target and the operation type on the simulation screen by the received touch operation;
a setting screen data extraction step of referencing the editing data storage unit so as to extract the setting screen data corresponding to the operation target and the operation type which are identified;
an editing processing step of editing the extracted setting screen data;
a setting screen output step of outputting, to the display unit, the setting screen data after being edited; and
an editing data generation step of generating the editing data based on tool information, machining shape information on a machining shape in a tool indicated by the tool information, machining path information on a machining path in the tool indicated by the tool information and the machining shape indicated by the machining shape information and operation type information on the operation type.

\* \* \* \* \*